United States Patent
Heverly, II et al.

(10) Patent No.: US 9,145,946 B2
(45) Date of Patent: Sep. 29, 2015

(54) ACTIVE VIBRATION ISOLATION SYSTEM

(71) Applicant: Bell Helicopter Textron Inc., Fort Worth, TX (US)

(72) Inventors: David E. Heverly, II, Arlington, TX (US); Taeoh Lee, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 181 days.

(21) Appl. No.: 13/840,408

(22) Filed: Mar. 15, 2013

(65) Prior Publication Data

US 2014/0263825 A1 Sep. 18, 2014

(51) Int. Cl.
*F16F 15/027* (2006.01)
*F16F 9/512* (2006.01)
*B64C 27/00* (2006.01)

(52) U.S. Cl.
CPC ........... *F16F 15/0275* (2013.01); *B64C 27/001* (2013.01); *F16F 9/5126* (2013.01); *B64C 2027/002* (2013.01); *B64C 2027/004* (2013.01)

(58) Field of Classification Search
CPC ............ B64C 27/001; B64C 2027/002; B64C 2027/004; F16F 9/5126
See application file for complete search history.

(56) References Cited

U.S. PATENT DOCUMENTS

| | | | |
|---|---|---|---|
| 3,119,230 A * | 1/1964 | Kosoff | 60/595 |
| 3,477,665 A | 11/1969 | LeGrand | |
| 3,514,054 A * | 5/1970 | Mard et al. | 244/17.27 |
| 4,236,607 A | 12/1980 | Halwes et al. | |
| 4,781,363 A | 11/1988 | Braun | |
| 5,040,851 A | 8/1991 | Maeba | |
| 5,050,835 A * | 9/1991 | Tobias | 248/550 |
| 5,062,498 A * | 11/1991 | Tobias | 180/308 |
| 5,101,929 A * | 4/1992 | Tobias | 180/300 |
| 5,168,703 A * | 12/1992 | Tobias | 60/418 |
| 5,251,883 A * | 10/1993 | Simon et al. | 267/136 |
| 5,310,017 A | 5/1994 | Tobias | |
| 5,316,240 A * | 5/1994 | Girard et al. | 244/17.27 |
| 5,732,905 A * | 3/1998 | Krysinski | 244/17.27 |
| 6,431,530 B1 * | 8/2002 | Stamps et al. | 267/136 |
| 6,695,106 B2 | 2/2004 | Smith et al. | |
| 8,672,262 B2 * | 3/2014 | Griffin | 244/54 |
| 2006/0151272 A1 | 7/2006 | Smith et al. | |
| 2011/0303784 A1 | 12/2011 | Heverly, II et al. | |
| 2012/0134847 A1 * | 5/2012 | Conley et al. | 417/15 |
| 2013/0175389 A1 * | 7/2013 | Griffin | 244/54 |

OTHER PUBLICATIONS

H. Rottmayr, et al., "Application of Modern Vibration Control Techniques on EC135 and Future Trends," 23rd European Rotorcraft Forum, Dresden, Germany, Sep. 16-18, 1997, 17 pages.
Extended European Search Report issued in European Application No. 14153504.7 on Aug. 14, 2014; 9 pages.
Communication under Rule 71(3) EPC issued in European Application No. 14153504.7 on Mar. 10, 2015; 37 pages.
Office Action issued in Canadian Application No. 2,846,849 on Feb. 16, 2015; 3 pages.

* cited by examiner

*Primary Examiner* — Joseph W Sanderson
(74) *Attorney, Agent, or Firm* — Fish & Richardson P.C.

(57) ABSTRACT

An apparatus includes an active vibration isolation system that includes a vibration isolator, a dual fluid pump in fluid communication with the vibration isolator and a hydraulic system, wherein the dual fluid pump is configured to segregate a tuning fluid from a hydraulic fluid and an electric-hydraulic servo valve in fluid communication with the dual fluid pump.

19 Claims, 6 Drawing Sheets

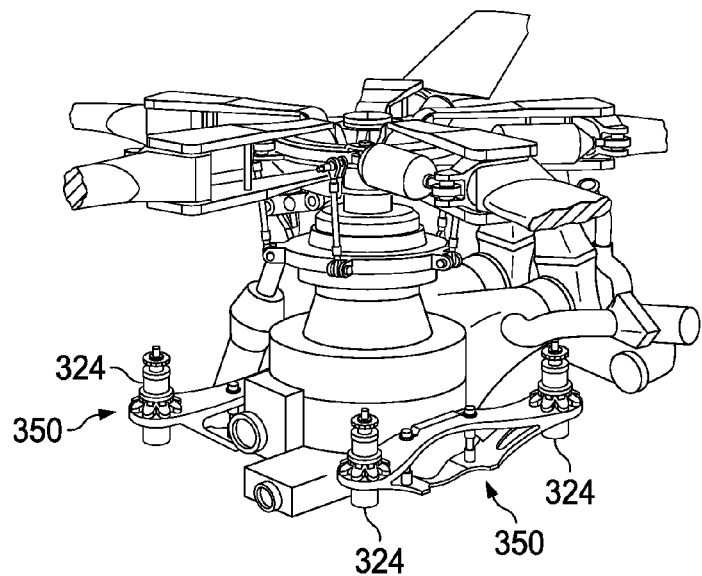
FIG. 4
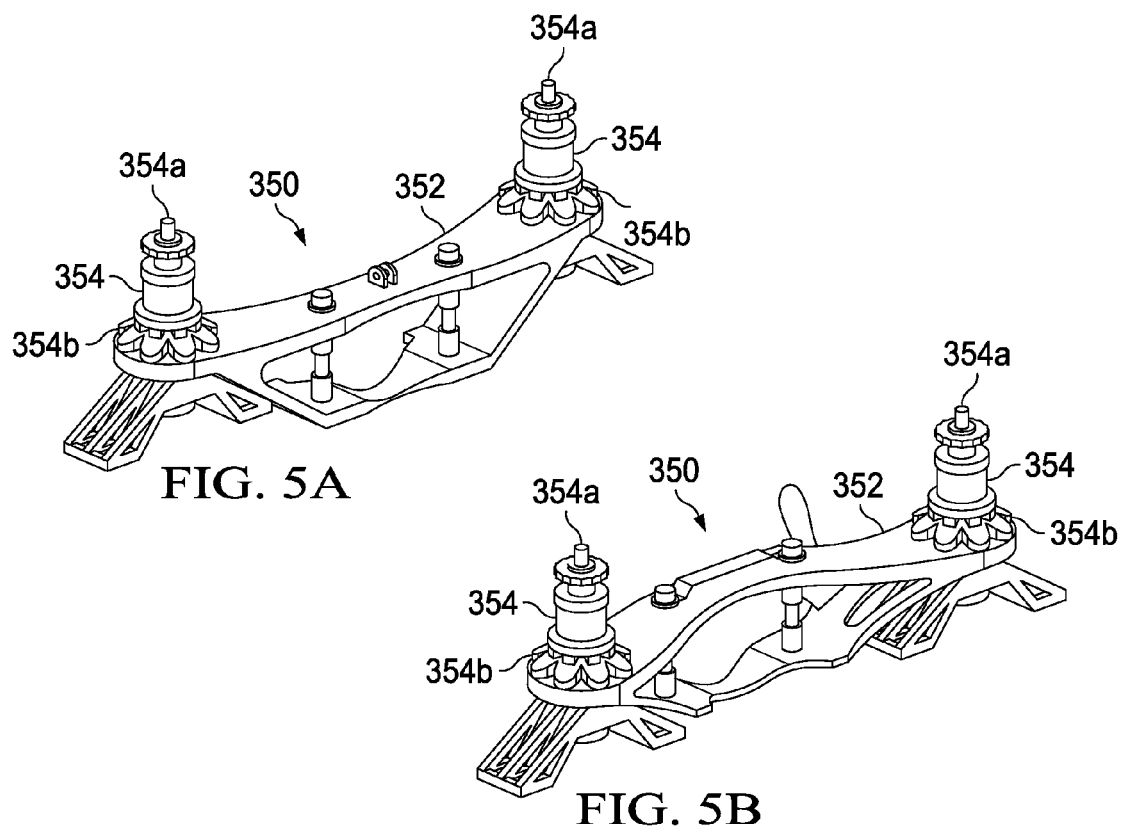
FIG. 5A
FIG. 5B

ACTIVE VIBRATION ISOLATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The rotor system of an aircraft, such as a helicopter or tiltrotor aircraft, can act as a source of vibration during operation of the aircraft. The aircraft can include a vibration isolation or suppression system to attenuate the vibration as it is transmitted from the rotor system to the airframe. Isolating the vibration as it is transmitted to the airframe can serve to mitigate material fatigue, flight control problems, or other issues that can arise from excessive levels of vibration within the airframe. The amount of attenuation or isolation provided by a passive vibration isolation system can be reduced when acted upon by a vibration of a frequency outside of a designed or tuned frequency range of the passive isolation system.

SUMMARY

In some embodiments of the disclosure, an apparatus is disclosed as comprising an active vibration isolation system that comprises a vibration isolator, a dual fluid pump in fluid communication with the vibration isolator and a hydraulic system, wherein the dual fluid pump is configured to segregate a tuning fluid from a hydraulic fluid and an electric-hydraulic servo valve in fluid communication with the dual fluid pump.

In other embodiments of the disclosure, an active vibration control system for an aircraft is disclosed as comprising a vibration isolator, a dual fluid pump in fluid communication with both the pylon mount and a hydraulic system of the aircraft, wherein the dual fluid pump is configured to segregate a tuning fluid from a hydraulic fluid and a control computer configured to measure vibration within a fuselage of the rotorcraft and be in signal communication with the vibration isolator and the dual fluid pump.

In still other embodiments of the disclosure, a method of isolating vibration is disclosed as comprising isolating vibration transmitted from a gearbox using a vibration isolation system, outputting a control signal to an electric-hydraulic servo valve, communicating a first fluid between the electric-hydraulic servo valve and a dual fluid pump, communicating a feedback signal to the control computer corresponding to the measured displacement of a piston within the pump using a displacement transducer and communicating a second fluid between the vibration isolation system and the dual fluid pump, wherein the first fluid is segregated from the second fluid via the dual fluid pump.

BRIEF DESCRIPTION OF THE DRAWINGS

For a more complete understanding of the present disclosure and the advantages thereof, reference is now made to the following brief description, taken in connection with the accompanying drawings and detailed description:

FIG. 4 is an orthogonal view of a transmission and vibration isolator of the system of FIG. 3;

FIG. 5A is an orthogonal view of a vibration isolator of the system of FIG. 3;

FIG. 5B is an orthogonal view of a vibration isolator of the system of FIG. 3;

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

In some cases, it can be desirable to provide an AVIS configured to attenuate vibrations generated by the rotor system of an aircraft, such as a helicopter or other rotorcraft. In some embodiments of the disclosure, the AVIS can provide more effective isolation of vibrations across a larger frequency range relative to the isolation provided by passive vibration isolation systems. For example, the AVIS can comprise an EHSVAP and a dual fluid pump in fluid communication with a liquid inertia vibration eliminator (LIVE™) and the hydraulic system of the aircraft. In some embodiments, a control computer of the AVIS can provide feedback to the dual-fluid piston pump via signal outputs from a displacement transducer and one or more vibration sensors coupled to the aircraft. In such embodiments, the dual-fluid piston pump can be configured to actuate the LIVE using feedback from the control computer.

Figure 1:
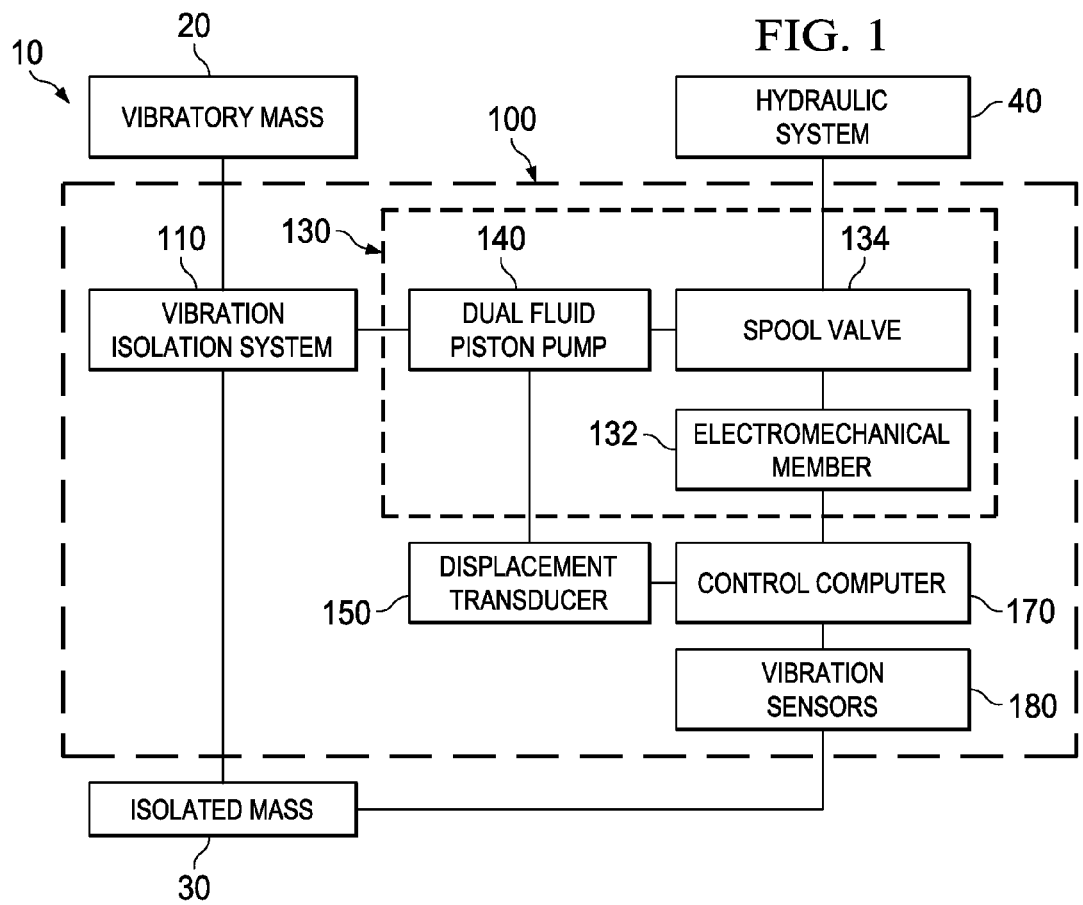
FIG. 1 is a schematic illustration of an active vibration isolation system (AVIS) according to an embodiment of the disclosure.

Referring now to FIG. 1, a block diagram illustrating a system 10 is shown according to an embodiment of the invention. In this embodiment, system 10 generally comprises a vibratory mass 20, an isolated mass 30, a hydraulic system 40 and an AVIS 100. The vibratory mass 20 can sinusoidally oscillate or vibrate. The isolated mass 30 can comprise a relatively rigid structure, such as a frame or other load bearing structure for supporting a payload.

The AVIS 100 can be configured to act as a buffer to attenuate or isolate vibratory forces transmitted to the isolated mass 30 of the system 10. In an embodiment, AVIS 100 generally comprises a vibration isolation system 110, an EHSVAP 130, a control computer 170 and at least one vibration sensor 180. In some embodiments, EHSVAP generally comprises a servo valve 134 actuated by an electromechanical member 132, a dual fluid pump 140 and a displacement transducer 150. For example, vibration isolation system 110 is coupled between the vibratory mass 20 and the isolated mass 30 of the system 10, allowing vibration isolation system 110 to attenuate vibratory forces produced by vibratory mass 20 before they are transmitted to the isolated mass 30.

In an embodiment, vibration isolation system 110 can comprise a vibration isolator, such as a LIVE unit. LIVE unit vibration isolators are disclosed in U.S. Pat. No. 4,236,607, which is incorporated in its entirety herein by reference. For example, the LIVE unit can comprise a piston coupled to the vibratory mass 20 and disposed within a housing coupled to the isolated mass 30 that is filled with a tuning mass comprising a tuning fluid having a relatively high density and low viscosity. In some examples, the tuning fluid has a density of about 1.6-1.9 grams per centimeters cubed, a kinematic viscosity of about 0.4-0.9 centistokes, a boiling point of about 80-120° Celsius and a pour point of lower than about −40° Celsius. A tuning port can extend axially through the piston, providing fluid communication between opposing fluid chambers disposed between the housing and each axial end of the piston. Vibratory or oscillatory motion from mass 20 can be transmitted to the piston, causing the tuning fluid disposed within the housing to flow between each fluid chamber via the tuning port.

The effectiveness of the LIVE unit's ability to isolate vibration (i.e., prevent vibration from being transmitted from vibratory mass 20 to isolated mass 30) at a given amplitude and frequency can depend on the total mass of the tuning fluid, the cross-sectional area of the tuning port, the cross-sectional area of the piston, the stiffness of the piston motion and other factors. Further, the effectiveness of the LIVE unit in isolating vibration varies with the frequency of vibration of the vibratory mass 20. Thus, a LIVE unit can more effectively isolate vibration within a particular vibration frequency range than vibration at frequencies outside of the range.

One factor in the relationship between the effectiveness of vibratory isolation of the LIVE unit and vibration frequency can relate to the passive nature of the LIVE unit, in that flow of the tuning fluid through the tuning port and oscillation of the piston is driven passively in response to vibration of the vibratory mass 20. In some embodiments, AVIS 100 can allow for active pumping of tuning fluid through the vibration isolation system in response to a signal from a controller, such as control computer 170. In this manner, the vibration isolation provided by system 110 can be continuously adjusted during operation of the system 10. For example, vibration isolation system 110 can be adjusted or actuated in response to the frequency and/or amplitude of the vibration transmitted to system 110 by vibratory mass 20. Also, system 110 can be adjusted in response to the measured vibration within isolated mass 30, as a result of vibrations being transmitted from isolation system 110 to isolated mass 30.

In some embodiments, EHSVAP 130 is configured to actuate the vibration isolation system 110 in response to signals or data received from a controller, such as control computer 170. In actuating the vibration isolation system 110 in response to signals from control computer 170, EHSVAP can be configured to convert the electronic signals from control compute 170 into a hydraulic force for actuating vibration isolation system 110 via the hydraulic power supplied by the hydraulic system 40.

For example, the electromechanical member 132 of EHSVAP 130 can be configured to convert a received signal from the control computer 170 into a mechanical force for actuating the servo valve 134. The servo valve 134 can be in fluid communication with the hydraulic system 40 and the dual fluid pump 140. In some examples, servo valve 134 can comprise a hydraulic spool or servo valve having a plurality of ports and a piston that is translatable in response to actuation from the electromechanical member 132. Translation of the piston can result in fluid flow through one or more of the ports, where each port is in fluid communication with a corresponding port of the dual fluid pump 140.

In some embodiments, the dual fluid pump 140 can be configured to displace tuning fluid of the isolation system 110 in response to actuation from servo valve 134. Pump 140 can comprise a piston that is translatable in response to the displacement of hydraulic fluid from hydraulic system 40 via actuation of servo valve 134. The piston can displace tuning fluid in response to translation while allowing for the segregation of the tuning fluid and the hydraulic fluid provided by the hydraulic system 140. In some embodiments, the displacement transducer 150 can be configured to output a piston position signal corresponding to an axial position of the piston. For example, displacement transducer 150 can be a linear variable differential transformer (LVDT).

In some embodiments, the actuation of dual fluid pump 140 can actively alter the flow of tuning fluid through the tuning port of the vibration isolation system 110. The active actuation of dual fluid pump 140 can produce oscillating or sinusoidal flow of tuning fluid through the isolation system 110, which can isolate or attenuate vibration transmitted from the vibratory mass 20. For instance, the piston of pump 140 can be axially displaced in an oscillatory manner, resulting in oscillator or sinusoidal flow of tuning fluid through system 110. In some examples, pump 140 can be configured to allow for the adjusting the magnitude of tuning fluid displaced, the sinusoidal frequency of the displaced tuning fluid and the phase angle of the displaced tuning fluid.

In some embodiments, one or more vibration sensors 180 can be configured to measure vibrations within isolated mass 30. For example, one or more sensors 180 can be coupled to the isolated mass 30. In such examples, a plurality of sensors 180 can be coupled to isolated mass 30 at various locations of the mass 30. Sensors 180 can comprise accelerometers configured to provide a signal output corresponding to the proper acceleration of the sensor 180 in the fore-aft, lateral and vertical directions. However, in other embodiments sensors 180 can comprise other types of sensors capable of measuring vibration of a body or mass, such as velocity sensors, proximity sensors, piezoelectric sensors and the like.

In some embodiments, the control computer 170 is configured to receive signals outputted from the displacement transducer 150 and sensors 180 and output a command signal to the electromechanical member 132 for actuating servo valve 134. Control computer 170 can comprise a controller algorithm for processing the signal inputs provided by transducer 150 and sensors 180 to form a signal output configured to minimize the magnitude of vibratory force transferred between the vibratory mass 20 and the isolated mass 30. For instance, computer 170 can comprise a control loop feedback mechanism such as a proportional-integral-derivative (PID) controller algorithm. In some embodiments, control computer 170 can also comprise one or more amplifiers or other components configured for conditioning the signals outputted by transducer 150 and sensors 180.

Figure 2:
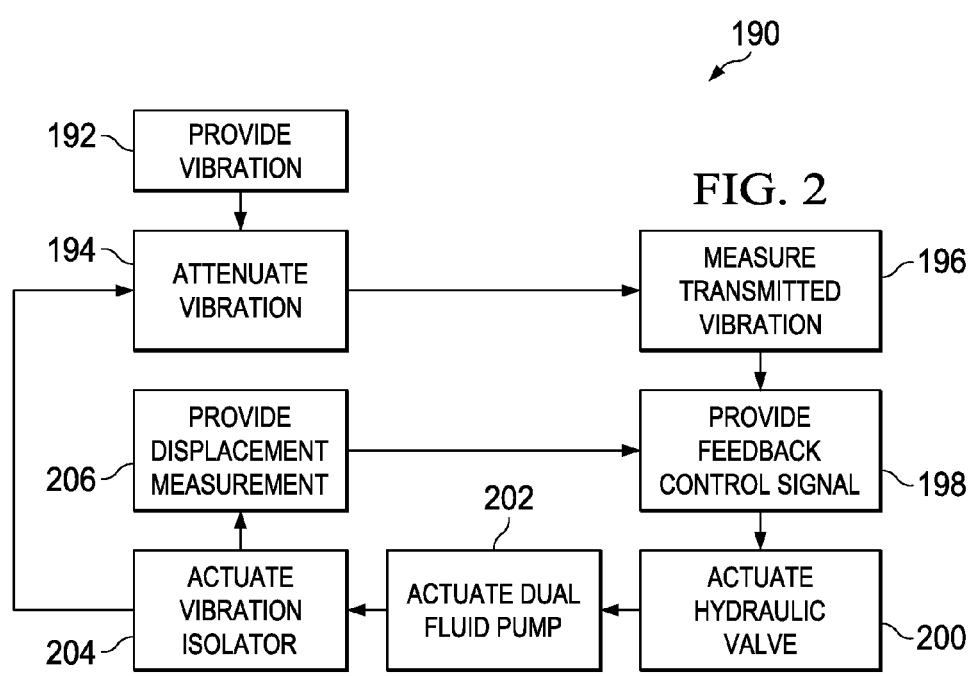
FIG. 2 is a flowchart of a method of actively isolating vibration according to an embodiment of the disclosure.

Referring now to FIG. 2, a method 190 can be used for isolating vibration of the vibratory mass 20 from the isolated mass 30 using AVIS 100. The method 190 can begin at block 192 by providing a vibration or vibratory force, such as the vibratory force provided by vibratory mass 20. The method 190 can continue at block 194 by attenuating or isolating the vibration provided at block 192 using a vibration isolator. For example, the vibration can be attenuated using a LIVE system. The method 190 can continue at block 196 by measuring the attenuated vibration transmitted to an isolated mass or mass coupled to the vibration isolator, such as isolated mass 30. For example, measuring the transmitted violation can be performed using one or more vibration sensors.

The method 190 can continue at block 198 by providing a command signal using a control computer, such as control computer 170. The method 190 can continue at block 200 by actuating a servo valve, such as servo valve 134, in response to the command signal outputted by the control computer. For example, actuating the servo valve can comprise actuating the valve using an electromechanical member configured to apply a mechanical force on the servo valve. The method 190 can continue at block 202 by actuating a dual fluid pump in response to actuation provided at block 200. For example, actuating a dual fluid pump can comprise using hydraulic pressure and energy provided by a hydraulic system. In such examples, the hydraulic system can be a component of the isolated mass, such as isolated mass 30.

The method 190 continues at block 204 by actuating the vibration isolator described in block 194 in response to the actuation provided at block 202. In some embodiments, actuating the vibration isolator can comprise displacing a tuning fluid between the vibration isolator and the dual fluid pump. For example, the tuning fluid has a density of about 1.6-1.9 grams per centimeters cubed, a kinematic viscosity of about 0.4-0.9 centistokes, a boiling point of about 80-1200 Celsius and a pour point of lower than about −400 Celsius. The method 190 can continue at block 206 by providing a displacement measurement of a piston of the dual fluid pump to the control computer described at blocks 198 and 200. In some examples, providing a displacement measurement can comprise outputting a signal from a LVDT corresponding to the displacement measurement. Further, referring back to block 198, providing a control signal can comprise processing the measured vibration signal at block 196 and the displacement signal provided at block 206.

Figure 3:
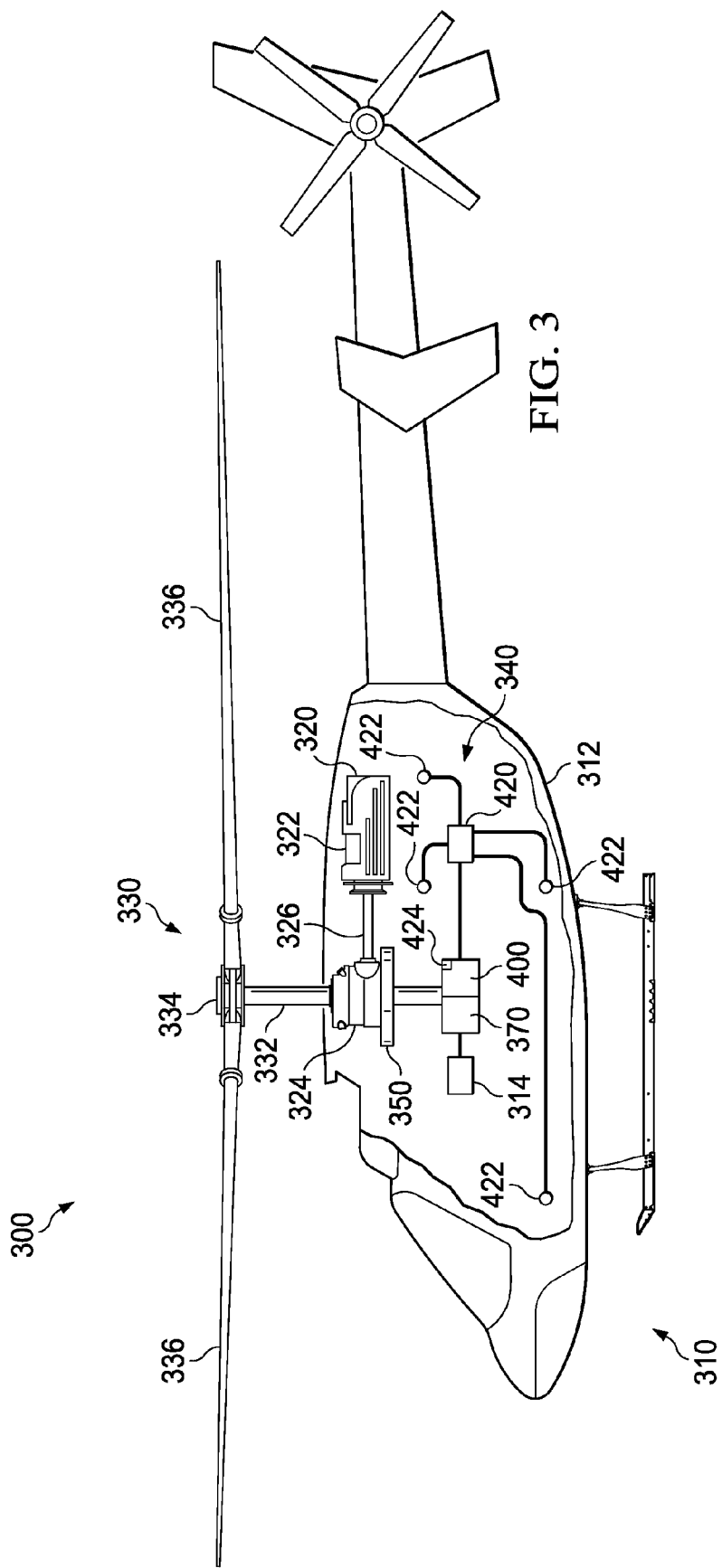
FIG. 3 illustrates a system including an AVIS according to an embodiment of the disclosure.

Referring now to FIG. 3, a system 300 according to an embodiment of the disclosure is shown. System 300 generally comprises an aircraft or rotorcraft 310 having a fuselage 312, hydraulic system 314 and a drive train 320 comprising an engine 322 coupled to a transmission 324 via a driveshaft 326. Drive train 320 further comprises a rotor system 330 that generally includes a mast 332 extending between the transmission 324 and a rotor 334 having a plurality of rotor blades 336 extending therefrom. It will be appreciated that while a helicopter is illustrated in FIG. 3, the described systems and methods could be applied to fixed-wing aircraft, tiltrotor aircraft, or any other type of vehicle or equipment.

The rotor system 330 of drive train 320 can produce sinusoidal or oscillatory vibratory forces during operation, the frequency range and amplitude of which can depend upon the number of rotor blades, the revolutions per minute (RPM) of the rotor, the speed of the aircraft and other factors. The frequency range of vibratory forces generated by the drive train 320 can also depend upon whether the rotorcraft system is a variable rotor speed (RPM) rotorcraft having a rotor with a plurality of operational rotor speeds. For example, rotor system 330 of drive train 320 can be of the variable rotor speed type. However, in some other examples, rotor system 330 can only have a single operational rotor speed.

System 300 further includes an example AVIS 340 that is an embodiment of the AVIS 100 disclosed in FIG. 1. Example AVIS 340 generally comprises a vibration isolator 350, an electro-hydraulic servo valve (EHSV) 370, a dual fluid pump 400, a control computer 420, a plurality of vibration sensors 422 and a displacement transducer 424. In FIG. 3, vibration isolator 350 is coupled to both fuselage 312 and transmission 324 of drive train 320. In this arrangement, vibrations generated by the operation of the rotor system 330 of rotorcraft 310 (e.g., during flight) can be attenuated by vibration isolator 350 as they are transmitted from rotor system 330 and transmission 324 to the fuselage 312.

Referring now to FIGS. 4, 5A and 5B, orthogonal views of transmission 324 and vibration isolator 350 of system 300 are shown. In FIGS. 4, 5A, and 5B, vibration isolator generally comprises a frame 352 that is coupled to the fuselage 312 (shown in FIG. 3) and a plurality of LIVE units 354 having a first or upper end 354a and a second or lower end 354b. Transmission 324 is coupled to LIVE units 354 at the upper end 354a of each unit 354. Also, the lower end 354b of each LIVE unit 354 is coupled to the frame 352. In this arrangement, vibratory forces applied to transmission 324 from rotor system 330 (shown in FIG. 3) can be attenuated or isolated via LIVE units 354 prior to being transmitted to frame 352 and fuselage 312.

Figure 6:
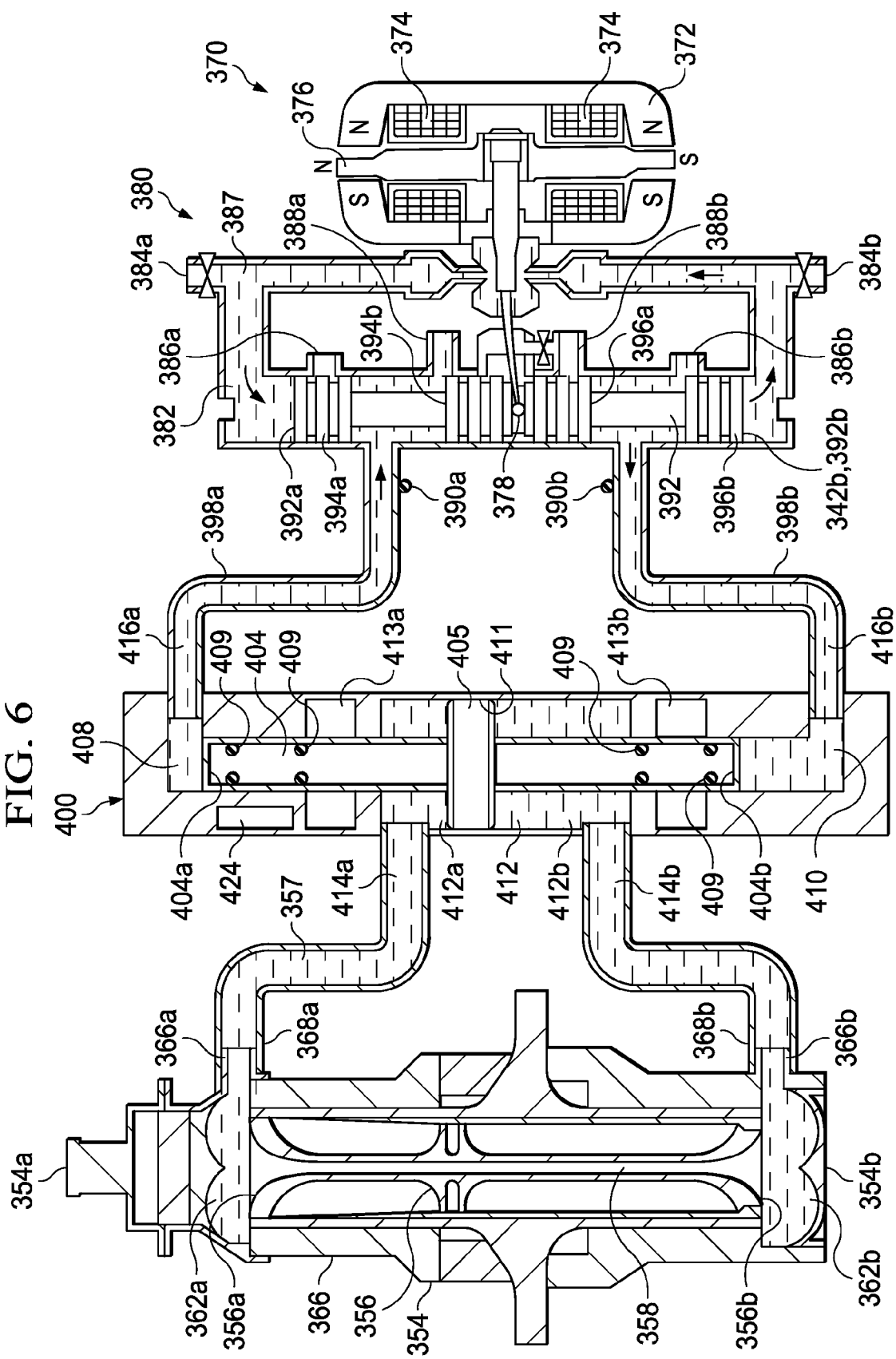
FIG. 6 is a schematic view of an electro-hydraulic servo valve actuated pumper (EHSVAP) of the system of FIG. 1.

Referring now to FIG. 6, a schematic view of an embodiment of LIVE unit 354, EHSV 370 and dual fluid pump 400 are shown. In this embodiment, LIVE unit 354 generally comprises a piston 356 having a first end 356a and a second end 356b that is disposed within an outer housing 360. Piston 356 also comprises a tuning port 358 extending axially through the piston 356 between first end 356a and second end 356b. A first chamber 362a is formed between the first end 356a of piston 356 and housing 360 and a second chamber 362b is formed between the second end 356b and housing 360. A tuning fluid 357 is disposed within each chamber 362a, 362b and tuning port 358 of piston 356. For example, the tuning fluid has a density of about 1.6-1.9 grams per centimeters cubed, a kinematic viscosity of about 0.4-0.9 centistokes, a boiling point of about 80-120° Celsius and a pour point of lower than about −40° Celsius. Tuning fluid can be communicated between chambers 362a, 362b and dual fluid pump 400 via a first port 366a in fluid communication with first chamber 362a and a second port 366b in fluid communication with second chamber 362b. Also, each port 366a, 366b, is coupled to a corresponding fluid conduit 368a, 368b, respectfully, to provide fluid communication between LIVE unit 354 and dual fluid pump 400.

In FIG. 6, EHSV 370 generally comprises an electromechanical member 372 and a servo valve 380. In some embodiments, member 372 generally comprises an electro-magnetic torque motor having a plurality of coil windings 374 in signal communication with the control computer 420. Each winding 374 is disposed about a magnet 376 coupled to an elongate arm 378. Member 372 can further comprise an amplifier for conditioning signals communicated by the control computer 420. In FIG. 6, servo valve 380 generally comprises a fluid conduit 382 having a first pair of supply ports 384a, 384b, a second pair of supply ports 386a, 386b, a pair of return ports 388a, 388b and a pair of outlet ports 390a, 390b, all in fluid communication with the hydraulic system 314 of rotor craft 310 shown in FIG. 3.

In FIG. 6, valve 380 further comprises a piston 392 disposed within conduit 382. Piston 392 has a first end 392a, a second end 392b and comprises a first pair of annular seals 394a, 394b, and a second pair of annular seals 396a, 396b. Piston 392 also includes an axial through bore 392c that allows for fluid communication between the pair of supply ports 384a, 384b. Elongate arm 378 physically engages piston 392 between seals 394b and 396a, and can axially displace piston 392 within conduit 382 in response to a force applied to the arm 378 from magnet 376 and windings 374. As piston 392 is axially displaced within conduit 382, supply port 386a can be sealed by annular seal 394a, return port 388a can be sealed by annular seal 394b, supply port 386b can be sealed by annular seal 396b and return port 388b can be sealed by annular seal 396a.

As shown in FIG. 6, piston 392 has been displaced in the direction of second end 392b. In this configuration, a first route of fluid communication is provided between return port 388a and outlet port 390a and a second route of fluid communication is provided between outlet port 390b and second supply port 386b. In this arrangement, hydraulic fluid 387 flows from dual fluid pump 400 into valve 380 via a first conduit 398a and outlet port 390a, and returns to the hydraulic system 314 via first return port 388a; and hydraulic fluid flows into valve 380 via second supply port 386b, and flows into dual fluid pump 400 via outlet port 390b and a second fluid conduit 398b. In some examples, hydraulic fluid is supplied to valve 380 by hydraulic system 314 at an approximate range of 1,250-3,000 pounds per square inch (PSI) and is returned to system 314 at an approximate range of 50-150 PSI.

In some embodiments, dual fluid pump 400 is configured to allow for the communication of tuning fluid between LIVE unit 354 and pump 400 and hydraulic fluid between servo valve 380 and pump 400 while maintaining segregation between the tuning fluid and hydraulic fluid. Dual fluid pump generally comprises a housing 402 having a piston assembly 404 disposed in a passage 406 therein. Piston assembly 404 has a first end 404a, a second end 404b and a flange 405 axially disposed between the first and second ends 404a and 404b. For example, three fluid chambers are formed within the housing 402: a first outer chamber 408 disposed between an inner surface of passage 406 and first end 404a of piston assembly 404, a second outer chamber 410 disposed between an inner surface of passage 406 and the second end 404b of piston assembly 404, and a third or inner chamber 412 that is formed between a pair of annular seals 409, disposed radially between the housing 402 and an outer surface of the piston assembly 404. Also, an annular seal 409 is disposed radially between an outer surface of piston assembly 404 and an inner surface of passage 406 near each end 404a, 404b, of piston assembly 404.

In such embodiments, an annular seal 411 is created between an outer radial surface 405a of flange 405 and the inner surface of the passage 406 of housing 402. Seal 411 can divide third chamber 412 into a first portion 412a and a second portion 412b. Housing 402 of dual fluid pump 400 can further comprise a plurality of ports for providing fluid communication between pump 400 and both LIVE unit 354 and servo valve 380. In such embodiments, housing 402 further comprises a pair of tuning fluid ports 414a, 414b. First tuning port 414a of housing 402 is in fluid communication with first fluid conduit 368a and corresponding first port 366a of LIVE unit 354. Second tuning port 414b is in fluid communication with second fluid conduit 368b and second port 366b of LIVE unit 354.

In such embodiments, housing 402 of dual fluid pump 400 can comprise a pair of vent cavities 413a and 413b, with cavity 413a disposed axially between first end 404a and third chamber 412 and cavity 413b disposed axially between third chamber 412 and second end 404b of piston assembly 404. Vent cavities 413a and 413b can be configured to allow for the venting to atmosphere of the hydraulic fluid 387 or the tuning fluid 357 in the event that any of the annular seals fail during operation, and thus form a leak path to one of the vent cavities 413a and 413b.

In such embodiments, housing 402 further comprises a pair of hydraulic fluid ports 416a, 416b. First hydraulic fluid port 416a is in fluid communication with first conduit 398a and corresponding first outlet port 390a of valve 380. Second hydraulic port 416b is in fluid communication with second conduit 398b and corresponding second outlet port 390b of valve 380.

In some embodiments, EHSVAP is configured to adjust the oscillating or sinusoidal flow of tuning fluid through the LIVE unit 354. For example, a control signal outputted from the control computer 420 can be received by the electromechanical member 372, which can cause elongate arm 378 to actuate sinusoidally. Physical engagement between arm 378 and piston 392 can transmit the sinusoidal movement of arm 378 to piston 392. As piston 392 is displaced sinusoidally in conduit 382, hydraulic fluid is displaced to and from dual fluid pump 400 in an oscillating pattern. For example, as piston 392 is displaced axially in a first direction towards first end 392a, hydraulic fluid is displaced from the hydraulic system 314 into the first chamber 408 of dual fluid pump 400 via first fluid conduit 398a, and hydraulic fluid is displaced from the second chamber 410 of pump 400 back into system 314 via second fluid conduit 398b. Once piston 392 has reversed direction, and is displaced in the direction of second end 392b (as shown in FIG. 6), the flow of hydraulic fluid between pump 400 and valve 380 becomes reversed. In this configuration, hydraulic fluid is displaced from hydraulic system 314 into the second chamber 410 of pump 400 via second fluid conduit 398b and fluid is displaced from first chamber 408 into system 314 via first conduit 398a.

In some embodiments, the oscillating flow of hydraulic fluid between servo valve 380 and dual fluid pump 400 results in a corresponding oscillating or sinusoidal movement of piston assembly 404 within passage 406. For instance, when piston 392 of valve 380 is disposed in the arrangement shown in FIG. 6, the flow of hydraulic fluid into second chamber 410 increases the fluid pressure force acting on second end 404b of piston assembly 404. Meanwhile, as hydraulic fluid flows out of first chamber 408 and back into the hydraulic system 312 via first fluid conduit 398a, the fluid pressure force acting on first end 404a of piston assembly 404 is decreased. The relative increase of fluid pressure force acting on second end 404b and the relative decrease acting on first end 404a results in axial movement of piston assembly 404 within passage 406 in the direction of first end 404a. Reversing the direction of flow of hydraulic fluid into and out of chambers 408 and 410 can serve to relatively increase the pressure force acting on first end 404a and decrease the pressure force acting on second end 404b, resulting in axial displacement of piston assembly 404 in the opposite axial direction, towards second end 404b.

In some embodiments, the sinusoidal displacement of piston assembly 404 in passage 406 results in an adjustment of the oscillating flow of tuning fluid into and out of chambers 362a, 362b, tuning port 358, of LIVE unit 354 resulting from vibratory forces passing through the unit 354. Specifically, a closed fluid system 418 having an approximately constant or fixed volume is formed by the combination of first and second chambers 362a, 362b, tuning port 358, first and second fluid conduits 368a, 368b, and the third chamber 412 of dual fluid pump 400. As piston assembly 404 is displaced sinusoidally within passage 406, the relative size of first portion 412a and second portion 412b shift, causing tuning fluid to be displaced within fluid conduits 368a, 368b and tuning port 358. For instance, as piston assembly 404 is displaced axially in the direction of first end 404a, the relative volume of first portion 412a is decreased, thus expelling or pumping fluid from first portion 412a through conduit 368a and into first chamber 362a. In order to equalize fluid pressure within fluid system 418, tuning fluid within first chamber 362a is displaced through tuning port 358 toward second chamber 368b. Tuning fluid within second chamber 362b can be displaced through conduit 368b toward second portion 412b of chamber 412. The flow of tuning fluid within closed system 418 can be reversed by reversing the axial direction of displacement of piston assembly 404 within 406, towards second end 404b.

In some embodiments, the axial position or displacement of piston assembly 404 can be continuously monitored and an output signal corresponding to the axial position of piston assembly 404 can be transmitted via the displacement transducer 424, which can be coupled to the pump 400. The signal output of displacement transducer 424 can be used to compute the sinusoidal frequency of piston assembly 404 using control computer 420. For example, control computer 420 can be configured to adjust the sinusoidal frequency of piston assembly 404 in response to the frequency of vibrations measured by the one or more vibration sensors 422 coupled to the fuselage 312. In another example, the control computer 420 and EHSV 370 can be configured to adjust the volume of tuning fluid displaced within closed system 418, the sinusoidal frequency of the displaced tuning fluid and the phase angle of the displaced tuning fluid relative to the azimuth position of the rotor 334 of rotor system 330. In a further example, a control algorithm, such as a PID controller algorithm can be used to compute an output signal in response to the signals outputted from sensors 422 and displacement transducer 424. In an embodiment, displacement transducer 424 can comprise an LVDT.

Figure 7:
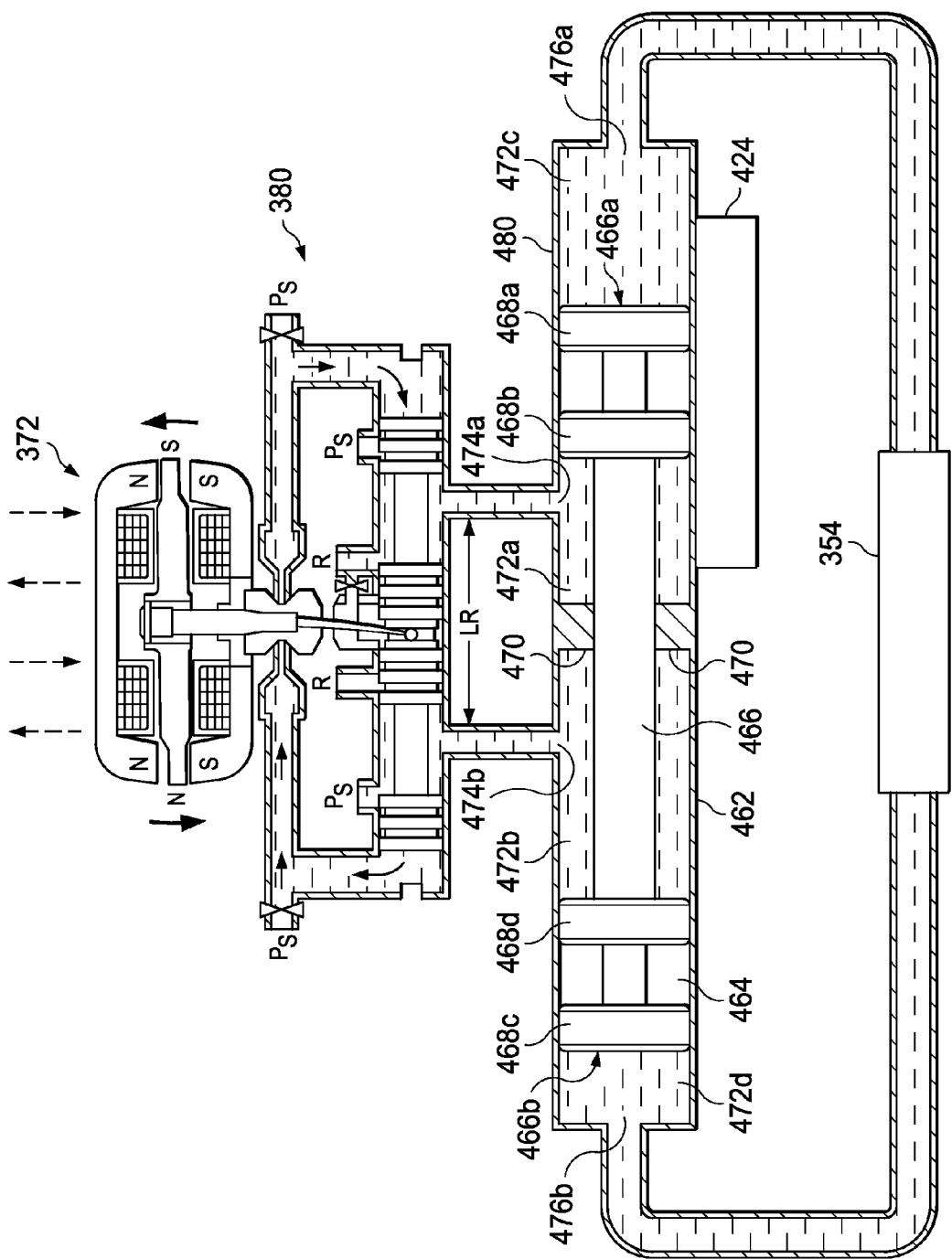
FIG. 7 is a schematic view of another embodiment of EHSVAP according to an embodiment of the disclosure.

Referring now to FIG. 7, a schematic view of LIVE unit 354 and another example embodiment of a dual fluid pump is shown for use with the system 300 of FIG. 3. In this example embodiment of FIG. 7, a dual fluid pump 460 comprises a housing 462 having a central passage 464 and a piston assembly 466 disposed within passage 464. Piston assembly 466 has a first end 466a and a second end 466b. Piston assembly 466 comprises a first flange 468a disposed at first end 466a and a second flange 468b axially spaced from first flange 468a. Piston assembly 466 also comprises a third flange 468c disposed at second end 466b and a fourth flange 468d axially spaced from third flange 468c. Each flange 468a-468d has an outer radial surface that sealingly engages an inner surface of passage 464.

Also, housing 462 includes a flange 470 that extends into passage 464 and sealingly engages an outer surface of piston assembly 466. This arrangement forms four fluid chambers: a first fluid chamber 472a disposed between flange 470 of housing 462 and second flange 468b of piston assembly 466, a second fluid chamber 472b disposed between flange 470 and fourth flange 468d of piston assembly 466, a third fluid chamber 472c disposed at first end 466a of piston assembly 466 and a fourth fluid chamber 472d disposed at second end 466b of piston assembly 466. Housing 462 further comprises a plurality of ports, with a first pair of inlet ports 474a, 474b, providing fluid communication from the servo valve 380 to first and second fluid chambers 472a, 472b, respectfully, and a pair of outlet ports 476a, 476b, providing fluid communication between third and fourth fluid chambers 472c, 472d, and LIVE unit 354. Displacement transducer 424 can measure the position or displacement of piston assembly 466 in passage 464.

Figure 8:
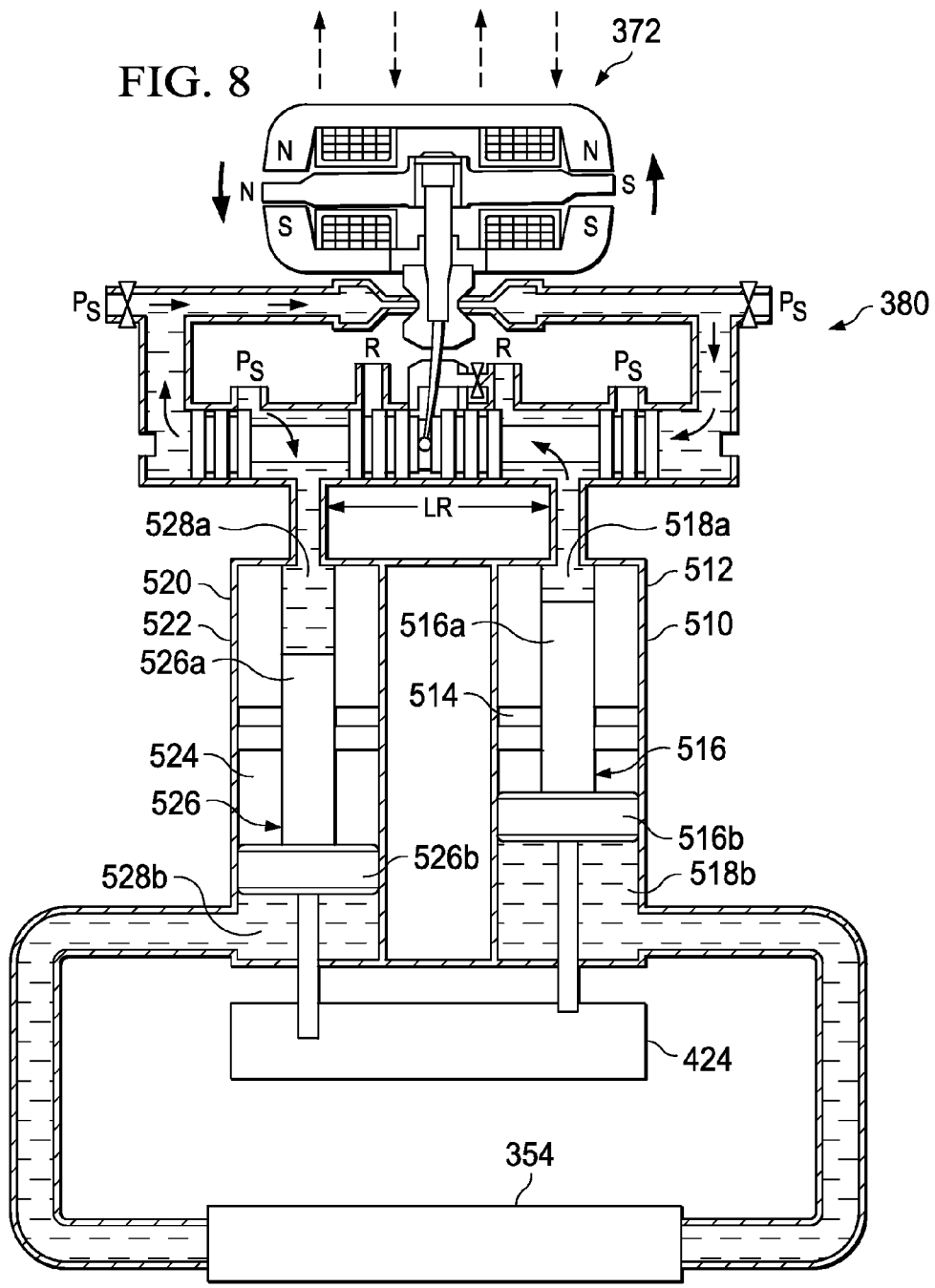
FIG. 8 is a schematic view of another embodiment of EHSVAP according to an embodiment of the disclosure.

Referring now to FIG. 8, a schematic view of LIVE unit 354 and another example embodiment of a dual fluid pump are shown for use with the system 300 of FIG. 3. In this example embodiment, a first dual fluid pump 510 comprises a housing 512 having a central passage 514 and a piston assembly 516a disposed within passage 514. Piston assembly 516a has a first end 516a and a second end 516b. A first fluid passage 518a provides fluid communication between servo valve 380 and pump 510 and a second fluid passage 518b provides fluid communication between pump 510 and LIVE unit 354. Similarly, second dual fluid pump 520 comprises a housing 522 having a central passage 524 and a piston assembly 526 disposed within passage 524. Piston assembly 526 has a first end 526a and a second end 526b. A first fluid passage 528a provides fluid communication between servo valve 380 and pump 520 and a second fluid passage 528b provides fluid communication between pump 520 and LIVE unit 354. Displacement transducer 424 can measure the linear position or displacement of piston assembly 516 of pump 510 and piston assembly 526 of pump 520.

Figure 9:
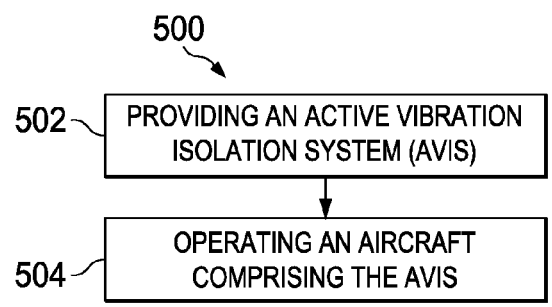
FIG. 9 is a flowchart of a method isolating vibration in an aircraft according to an embodiment of the disclosure.

Referring now to FIG. 9, a method 500 for isolating vibration in an aircraft. The method 500 can begin at block 502 by providing an AVIS. In this embodiment, "providing" the AVIS can comprise designing, manufacturing or assembling the AVIS. In an embodiment, the AVIS can comprise AVIS 300 described in FIGS. 3-8. The method 500 can continue at block 504 by operating an aircraft comprising the AVIS of block 502. In some embodiments, block 504 can comprise isolating or attenuating vibrations transmitted between a drive train (e.g., drive train 320 shown in FIG. 3) of an aircraft (e.g., aircraft 310) and the fuselage (e.g., fuselage 312) of the aircraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
   an active vibration isolation system, comprising:
      a vibration isolator to flow a tuning fluid;
      a dual fluid pump in fluid communication with the vibration isolator to flow the tuning fluid through the vibration isolator;
      an electro-hydraulic servo valve in fluid communication with the dual fluid pump to provide a hydraulic fluid to drive he dual fluid pump, the dual fluid pump to segregate the tuning fluid from the hydraulic fluid; and
      a hydraulic system configured to provide the hydraulic fluid to the electro-hydraulic servo valve.

2. The apparatus of claim 1, further comprising:
   a fuselage;
   an engine; and
   a gearbox; and
   wherein the active vibration isolation system is configured to attenuate a vibration from the engine, the gearbox or both.

3. The apparatus of claim 2, wherein the vibration isolator comprises a liquid inertia vibration eliminator (LIVE).

4. The apparatus of claim 2, further comprising a control computer configured to measure vibration within the fuselage and adjust the vibration isolator.

5. The apparatus of claim 4, wherein the electro-hydraulic servo valve is actuated in response to a signal communicated by the control computer.

6. The apparatus of claim 4, wherein the active vibration isolation system further comprises a displacement transducer configured to output a signal to the control computer corresponding to an axial position of a piston of the dual fluid pump.

7. The system of claim 4, wherein the control computer is in signal communication with one or more vibration sensors coupled to the fuselage.

8. The apparatus of claim 2, wherein the dual fluid pump is in fluid communication with the hydraulic system via the hydraulic fluid and wherein the dual fluid pump is in fluid communication with the vibration isolator via the tuning fluid.

9. The apparatus of claim 1, wherein the dual fluid pump of the active vibration isolation system comprises:
   a housing;
   a piston assembly having a first end, a second end and a flange disposed between the first and second ends; and
   a pair of outer fluid chambers disposed at each end of the piston assembly, wherein a first outer fluid chamber of the pair of outer fluid chambers is disposed at the first end of the piston assembly, and a second outer fluid chamber of the pair of outer fluid chambers is disposed at the second end of the piston assembly, and wherein the outer fluid chambers are in fluid communication with the hydraulic system via the hydraulic fluid; and
   a third fluid chamber disposed between the first end and the second end of the piston assembly, wherein the flange of the piston assembly is disposed within the third fluid chamber, and wherein the third fluid chamber is in fluid communication with the vibration isolator via the tuning fluid.

10. The apparatus of claim 1, wherein the dual fluid pump of the active vibration isolation system comprises:
    a housing;
    a piston assembly disposed within the housing, the piston assembly having a first end, a second end, a first outer flange disposed at the first end, a second outer flange disposed at the second end, and a pair of inner flanges disposed between the first and second outer flanges;
    a pair of outer fluid chambers disposed at each end of the piston assembly, wherein a first outer fluid chamber of the pair of outer fluid chambers is disposed at the first end of the piston assembly, and a second outer fluid chamber of the pair of outer fluid chambers is disposed at the second end of the piston assembly, and wherein the pair of outer fluid chambers are in fluid communication with the vibration isolator via the tuning fluid;
    a housing flange disposed axially between the pair of inner flanges that sealingly engages an outer surface of the piston assembly; and
    a pair of inner fluid chambers disposed between the housing flange and each inner flange of the pair of inner flanges of the piston assembly, wherein the pair of inner fluid chambers are in fluid communication with the hydraulic system via the hydraulic fluid.

11. The apparatus of claim 1, wherein the dual fluid pump of the active vibration isolation system comprises a first pump and a second pump, each of the first pump and the second pump comprising:
    a piston assembly having a first end, a second end, and a flange disposed between the first and second ends;
    a first fluid chamber disposed at the first end of the piston assembly and in fluid communication with the hydraulic system via the hydraulic fluid; and
    a second fluid chamber disposed at a face of the flange of the piston assembly and in fluid communication with the vibration isolator via the tuning fluid.

12. An active vibration control system for an aircraft, comprising:
    a vibration isolator to flow a tuning fluid;
    a dual fluid pump in fluid communication with both the vibration isolator and a hydraulic system of the aircraft, the dual fluid pump to flow the tuning fluid through the vibration isolator;
    an electro-hydraulic servo valve in fluid communication with the dual fluid pump to provide a hydraulic fluid from the hydraulic system to drive the dual fluid pump, the dual fluid pump to segregate the tuning fluid from the hydraulic fluid; and
    a control computer configured to measure vibration within a fuselage of the aircraft and be in signal communication with the vibration isolator and the dual fluid pump.

13. The system of claim 12, wherein the dual fluid pump is in fluid communication with hydraulic fluid of the hydraulic system and tuning fluid of the vibration isolator.

14. The system of claim 12, further comprising a displacement transducer configured to output a signal to the control computer corresponding to an axial position of a piston assembly of the dual fluid pump.

15. The system of claim 12, wherein the vibration isolator comprises a liquid inertia vibration eliminator (LIVE).

16. A method of isolating vibration from a gearbox using a vibration isolation system, the method comprising:
    outputting a control signal communicated by a control computer to an electro-hydraulic servo valve;
    communicating a first fluid between the electro-hydraulic servo valve and a dual fluid pump;
    communicating a feedback signal to the control computer corresponding to a measured displacement of a piston assembly within the pump using a displacement transducer; and communicating a second fluid between the vibration isolation system and the dual fluid pump, wherein the first fluid is segregated from the second fluid via the dual fluid pump.

17. The method of claim 16, wherein the gearbox is part of an aircraft fuselage, wherein the method further comprises:
measuring the position of the piston assembly of the dual fluid pump via the displacement transducer;
taking at least one vibration measurement from the fuselage using a vibration sensor;
transmitting a first signal corresponding to the vibration measurement to the control computer; and
transmitting a second signal corresponding to the measured position of the piston assembly of the dual fluid pump to the control computer.

18. The method of claim 17, further comprising processing the first signal corresponding to the vibration measurement and the second signal corresponding to the piston assembly position to form an output control signal.

19. The method of claim 16, further comprising actuating the electro-hydraulic servo valve in response to the control signal communicated by the control computer.

* * * * *